US000001122H

United States Statutory Invention Registration [19]

[11] Reg. Number: H1122

[43] Published: Dec. 1, 1992

Pavek

[54] FREQUENCY DECOMPOSITION INTO RANGE AND RANGE-RATE

[75] Inventor: Richard E. Pavek, Columbia, Md.

[73] Assignee: The United States of America as represented by the Secretary of the Navy, Washington, D.C.

[21] Appl. No.: 727,261

[22] Filed: Jun. 24, 1991

[51] Int. Cl.[5] ..... G01S 13/64

[52] U.S. Cl. ..... 342/95; 342/105

*Primary Examiner*—Bernarr E. Gregory

*Attorney, Agent, or Firm*—Thomas M. Phillips; Thomas E. McDonald; Alfons F. Kwitnieski

[57] ABSTRACT

A process that derives estimates of range and range-rate during the radar track of an object, when the radar employes a linear frequency modulated waveform. FM waveforms at the radar wavelength are transmitted. The frequency of the radar echos are measured and the difference between the incoming frequency of radar echos and the local oscillator frequency is estimated. The signal is decomposed into Range and Range rate. Implementation of the decomposition device can either be a sequence of stored software or a hardwired processor.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FREQUENCY DECOMPOSITION INTO RANGE AND RANGE-RATE

BACKGROUND OF THE INVENTION

1. Technical Field

The present invention relates to radar tracking of targets and more particularly to deriving estimates of range and range-rate during the radar track of an object, when the radar employs a linear frequency modulated waveform.

2. Background Art

The general concept of obtaining range and range-rate from target information from radar systems is known. U.S. Pat. No. 4,302,758 discloses a process and a method for obtaining range and range-rate estimates by mechanizing the solution of a linear differential equation.

SUMMARY OF THE INVENTION

The present invention provides for a process that derives estimate of range and range-rate during the radar track of a target, when the radar employs a linear frequency modulated (FM) waveform. The process separates (decomposes) the radar frequency measurement into two components by mechanizing a first-order system that is driven by the frequency measurements. The components become the range and range-rate estimates of the radar target. Accordingly, an object of the invention is the provision of a process that determines estimates of range and range-rate during the track of an object, when the radar employs a linear frequency modulated waveform.

Other objects, advantages and novel features of the invention will become apparent from the following detailed description of the invention when considered in conjunction with the accompanying drawings.

DETAILED DESCRIPTION

The invention is a process that derives estimates of range and range-rate during the radar track of an object, when the radar employs a linear frequency modulated waveform.

The first order equation for radar range, R(t) is $$-\frac{2}{\lambda}\frac{dR(t)}{dt}-\frac{2\dot{f}}{c}R(t)=f(t) \tag{1}$$

where f(t) is the radar-measured frequency, $\dot{f}$ is the linear FM rate (Hz/sec), λ is the the transmit wavelength, and c is the speed of light. Solutions to equation (1) have convergent behavior for positive $\dot{f}$, and divergent behavior for negative FM rates (i.e., negative $\dot{f}$).

Equation (1) suggests that an estimate of radar range is obtained as the output of a linear system, using an appropriate initial condition. The initial condition is the best available estimate of range at the time when radar tracking begins with a linear FM waveform. Let t=0 denote the start of such a radar track, and let $R_0$ denote the best estimate of range at that time.

Figure 1:
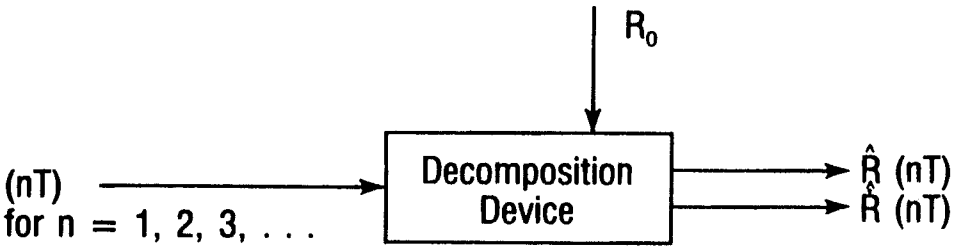
FIG. 1 is a block diagram of the decomposition device.

The decomposition device will use this initial range estimate, together with a sequence of radar frequency measurements. The device will output estimates of both range and range-rate at each iteration of the device, where an iteration shall occur upon the completion of each radar frequency measurement. FIG. 1 depicts a simple block diagram of the device, where T is the time between iterations, n is any integer, $R_0$ is the best estimate of range at t=0, and provides range and range-rate as outputs.

The specific operation of the device is defined by the recursive solution of the following equations with one initial condition, namely $\hat{R}(O)=R_0$.

$$\hat{R}(nT)=\frac{1}{1+\frac{\dot{f}\lambda T}{c}}\hat{R}((n-1)T)-\frac{\frac{\lambda T}{2}}{1+\frac{\dot{f}\lambda T}{c}}f(nT) \tag{2}$$

$$\hat{\dot{R}}(nT)=\frac{\hat{R}(nT)-\hat{R}((n-1)T)}{T} \tag{3}$$

These equations are exercised at each iteration for Values of n ranging from 1 to an arbitrary integer, N. Presumably N corresponds to the last opportunity to iterate the device before the radar waveform is altered, or the radar mission is complete. The device is a three-parameter system with constant parameters, $$\alpha=\frac{1}{1+\frac{\dot{f}\lambda T}{c}}\qquad \beta=\alpha\lambda\frac{T}{2}\qquad \gamma=\frac{1}{T} \tag{4}$$

These three parameters depend upon two physical system parameters, namely λ and $\dot{f}$; as well as one decomposition-induced parameter, namely the iteration period T. Using these parameters the device is the recursive solution of $$\hat{R}(nT)=\alpha\hat{R}((n-1)T)-\beta f(nT) \tag{5}$$

$$\hat{\dot{R}}(nT)=\gamma[\hat{R}(nT)-\hat{R}((n-1)T)] \tag{6}$$

The operation of the device may be described as follows. The device takes the product of α and the initial range estimate, $R_0$. It also takes the product of β and the first frequency measurement, and then subtracts this product from the first product. These steps represent the first iterative solution of equation (5), and they provide the first estimate of range at time t=T.

The first estimate of range is reduced by the initial estimate of range, and the difference is multiplied by γ to provide the first estimate of range-rate. These steps represent the first iterative solution of equation (6). All subsequent solutions of equations (5) and (6) are obtained in the same fashion by using subsequent frequency measurements together with the previous estimate of range, $\hat{R}(n-1)T)$.

Figure 2:
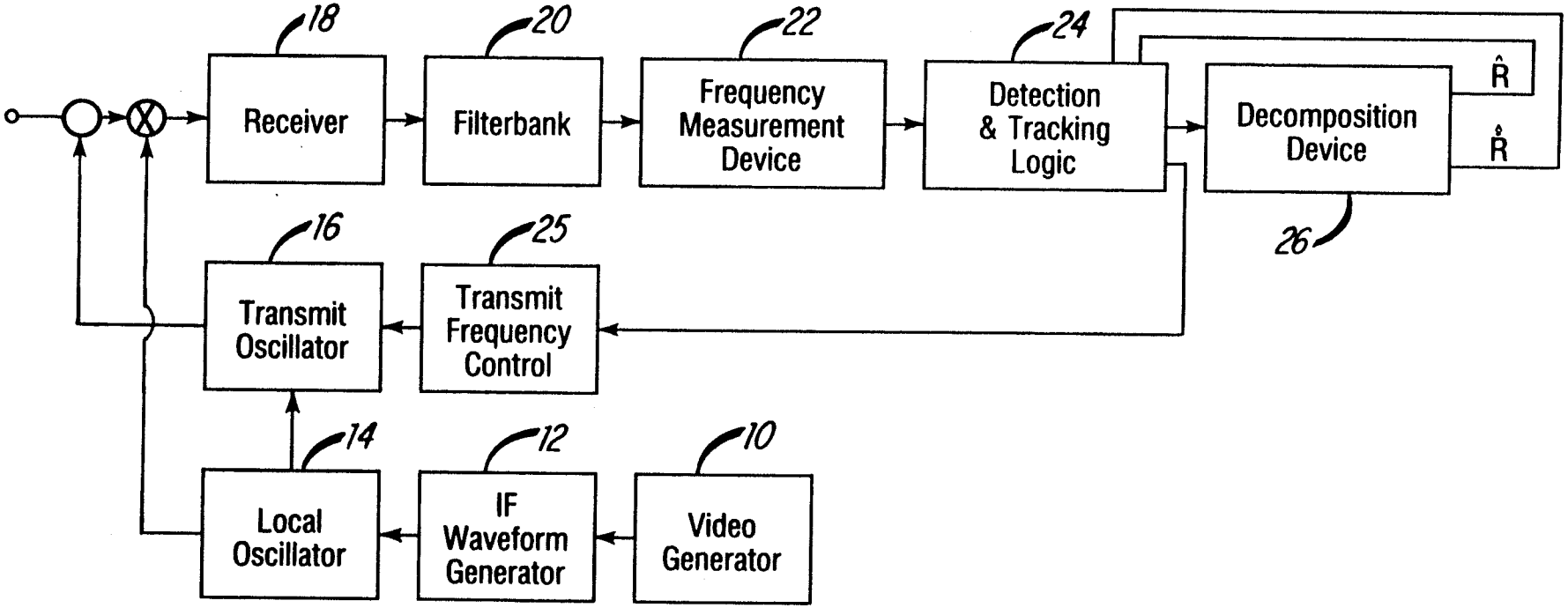
FIG. 2 is a block diagram of a conventional linear FM radar incorporating the disclosed decomposition device.

A conventional radar using a linear FM waveform has a block diagram as shown in FIG. 2. A video generator 10 produces a linear voltage pattern which is transferred onto an intermediate frequency in the IF waveform generator 12. Both the receiver local oscillator 14 and transmit oscillator 16 are driven by this IF waveform resulting in FM waveforms at the radar wavelength. Radar echoes are received at receiver 18, and detection and tracking logic 24 maintains track on radar objects. This is accomplished by a bank of filters 20 in the receiver where the filterbank spans the frequency interval of the objects to be tracked. The transmitter is controllable by the tracking logic 24 through a transmit frequency control device 25 which attempts to position the transmit frequency so that a desired radar object appears in the filterbank. The frequency control device can apply any frequency offset to accomplish the placement of a radar object in the filterbank.

The frequency measurement device 22 is also conventional; it estimates the frequency difference between the incoming frequency of the radar echo, and the local oscillator frequency. The frequency measurement device 22 accomplishes this by measuring the frequency of the object in the filterbank 20, and then applying a frequency correction (a constant) to allow for downconversions (translations in frequency) between the antenna and the frequency measuring device itself.

The frequency measurement device 22 provides an estimate of radar "doppler" frequency which obeys equation (1). So, for example, if $\dot{f}=o$, the radar "doppler" is just $-2/\lambda$ times the range-rate, which is a negative value for a radar object that has a closing relative velocity to the radar. When $\dot{f}$ is non-zero, the range-dependent term in equation (1) automatically contributes to the "doppler" frequency measurement.

The conventional radar with linear FM and a frequency measuring device is then followed by the decomposition device. The detection and tracking logic 24 uses the range and range-rate estimates of the decomposition device 26 in order to provide more intelligent control of the transmit frequency. It provides the capability of maintaining a more stationary frequency environment for a selected radar object being tracked. This advantage is accomplished by providing an aiding term (e.g., $-2\dot{R}\dot{f}/c$) to the transmit frequency controller.

Implementation of the decomposition device itself can either be a sequence of stored software algorithms, or a hardwired processor. In the software case the algorithms to be programmed are defined by equations (4), (5), and (6). Once the iteration time T is selected as a design constant or as a controllable system parameter, the constants $\alpha$, $\beta$, and $\gamma$, are defined for a given wavelength and FM slope. These constants together with an initial range estimate $R_0$ completely specify how the algorithm is executed by equations (5) and (6).

Figure 3:
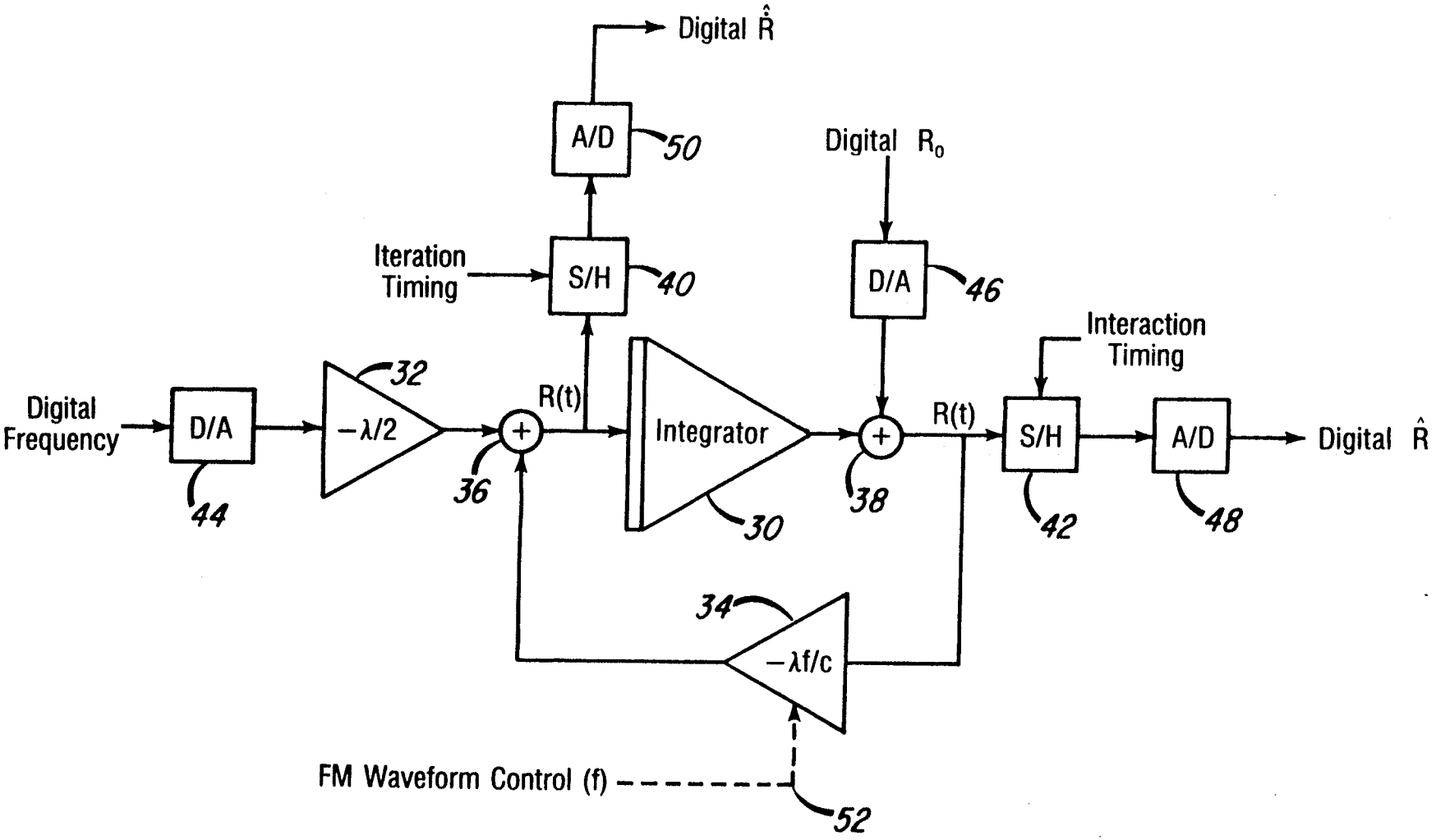
FIG. 3 is a block diagram of a handwired embodiment of the disclosed decomposition device.

Using a hardwired processor, the device is implemented as shown in FIG. 3. An integrator 30, two inverting amplifiers 32, 34, and two voltage combiners 36, 38 constitute the all-analog devices. A pair of sample-and-holds 40, 42 interface with the radar's computer. The D/A convertors 44, 46 map inputs into appropriate analog signals within the device. The range and range-rate analog signals are converted to digital words by the two A/D convertors 48, 50 and these digital words become commands to the radar computer. An optional FM waveform control path 52 is shown. This provides a means of changing the gain of amplifier 34 to reflect changes in the FM slope $\dot{f}$, if the system uses more than a single slope.

Several decomposition devices can be implemented to provide range and range-rate estimates for multiple radar objects. The objects include multiple targets, altitude return, mainlobe clutter, etc. In each application of the device an initial range estimate and sequence of frequency estimates must be provided for each radar object. It is assumed that the radar is detecting and tracking each object in the radar's filterbank, thus it is able to derive frequency measurements for each object.

It is further possible to use a single decomposition device in a multiplexed fashion to accommodate several radar objects. In a software implementation this is accomplished merely by exercising the software N times per iteration for N objects. A file of 2 N outputs is developed for range and range-rate, and the throughput is increased by a factor of N over a single object. In a hardwired implementation a multiplexer must select one of N integrators to use for a portion of the iteration period. Since only a portion of T is then used for each integration, the integration rate must be increased accordingly by increasing the gain of the integrator. In this way, a single device using a multiplexing network and N integrators can provide capability for N objects.

An alternate embodiment could replace N integrators with a single integrator and a sampling and re-initializing network. The latter network re-initializes the integrator and samples the integrator output N times per iteration.

Obviously many modifications and variations of the present invention are possible in light of the above teachings. It is therefore to be understood that within the scope of the appended claims the invention may be practiced otherwise than as specifically described.

I claim:

1. A process for deriving estimates of range and range-rate during the track of a target when the radar employs a single linear frequency modulated waveform, comprising the steps of:

successively measuring the radar frequency; and estimating both range, and range-rate at the compeletion of each radar frequency measurement using subsequent frequency measurements with the previous estimate of range.

2. The process of claim 1 wherein the last frequency measurement, N, corresponds to the last opportunity to measure the radar frequency before the radar waveform is altered.

3. The process of claim 1 wherein the step of estimating range includes: computing subsequent range and range rate each time frequency is measured using subsequent frequency measurements with the previous estimate of range.

4. A process of determining the range and range-rate of an object, comprising the steps of:

transmitting FM waveforms of a predetermined wavelength;

estimating the frequency difference between the incoming frequency of the echo of said transmitted waveform and the local oscillator frequency;

estimating initial range and range rate;

successively measuring the incoming echo frequency; and computing subsequent range and range rate each time frequency is measured using subsequent frequency measurements with the previous estimate of range.

* * * * *